Oct. 26, 1926.
R. E. LYONS
1,604,459
MIRROR AND PROCESS OF MAKING IT
Filed March 31, 1926
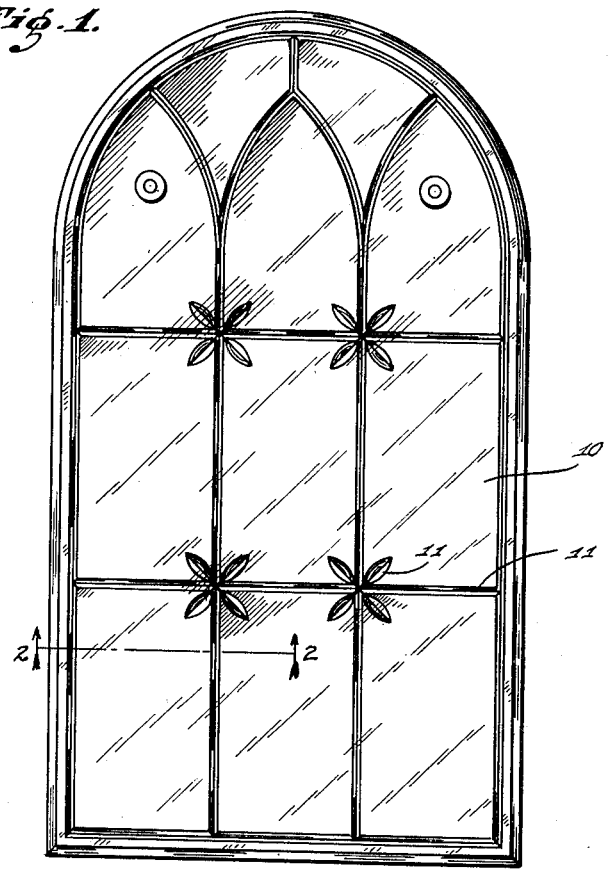
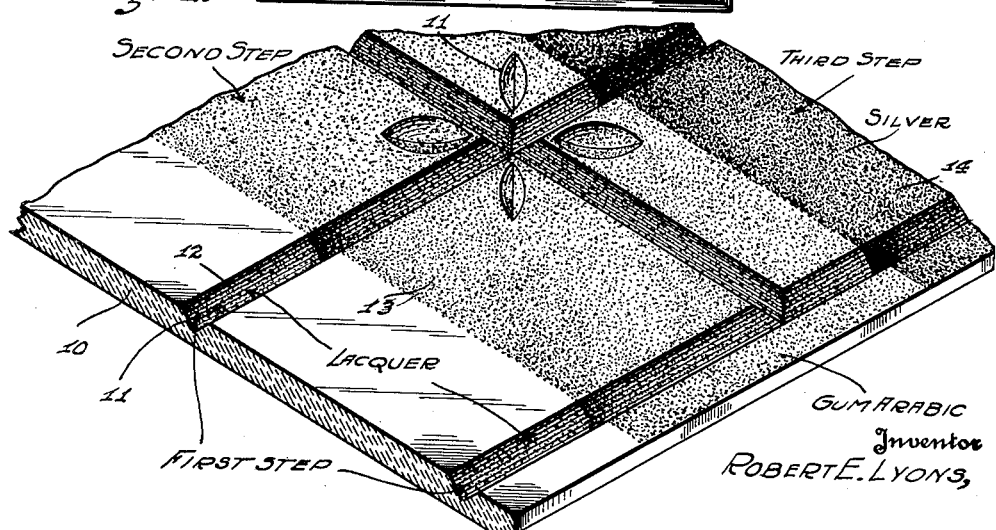
Inventor
ROBERT E. LYONS,
By G. B. Schley.
Attorney Patented Oct. 26, 1926.

1,604,459

UNITED STATES PATENT OFFICE.

ROBERT E. LYONS, OF BLOOMINGTON, INDIANA, ASSIGNOR TO THE NURRE MIRROR PLATE COMPANY, OF BLOOMINGTON, INDIANA, A CORPORATION OF INDIANA.

MIRROR AND PROCESS OF MAKING IT.

Application filed March 31, 1926. Serial No. 98,719.

It is the object of my invention to obtain the adhesion of a mirror-metal, such as a silver deposit, to a non-metal color-film which has been applied to part or all of a glass or glass-substitute surface, which may be generically termed a hyaline substance or the surface of a hyaline substance, whether on the normal plane surface of the glass or in some decorative etching which has been made in the glass surface; and also to lessen the difficulty of obtaining adhesion of such mirror-metal to the glass or glass-substitute surface, thus facilitating the preparation of the surfaces for receiving the metal deposits and reducing the time required for such preparation.

My invention relates both to the process and to the product.

More especially, my invention relates to the decorating of mirrors, by the application of a suitable color-film to the rear face of the mirror in a desired pattern, usually in etched depressions, and to the depositing of a mirror-metal, such as silver, over the rear surface of the mirror, both on the glass itself where it is exposed and on the color-film where that covers the glass; and to do this when the color-film is of non-metal nature, such as a nitro-cellulose lacquer suitably colored, as by aniline dye.

It has long been known that certain non-metal color-films can be applied to the surface of glass, and can be made to adhere thereto. Such non-metal color-films may be of various kinds, such as paints, lacquers, varnishes, and gum solutions; and I do not intend the term to require any actual color, although usually the color-film is colored. For the color-film I prefer transparent lacquers of the nitro-cellulose type, which give excellent results and are readily given any desired color, as by aniline dyes; but my invention is not limited to that type of color-film. However, when non-metal color films are used on the surface of the glass, it has heretofore been impossible to make a mirror-metal, such as silver deposit from a suitable solution containing silver, adhere to the color-film on the glass. It is even difficult to make such mirror-metal adhere to an ordinary glass surface, and the greatest care must be used in having the glass surface rigidly clean before the application of the silver-containing solution thereto, requiring most careful polishing and scrubbing of such glass surface; and with my invention this difficulty in obtaining adhesion of the mirror-metal to the glass itself is greatly reduced, even aside from the value of my invention in making the mirror-metal adhere to a color-film on the glass.

In order to obtain this adhesion of the mirror-metal to the color-film, and this better adhesion of the mirror-metal to the surface of the glass or glass-substitute itself, I apply over the glass or glass-substitute surface to be mirrored, and over the color-film wherever that has been applied to such surface, a solution of a substance which renders both the glass and the color-film wettable both by water and by the water solutions used in depositing the desired mirror-metal. Even after the solution of this treating substance has been washed off, presumably some of the substance itself remains, probably by being adsorbed on to the treated surfaces; for the surface of both the glass and the color-film remain wettable by water and by water solutions used in depositing mirror-metals, and will be wetted by such latter solutions when they are applied, so that the mirror-metal from such a solution is deposited upon and will adhere to both the surface of the glass and the surface of the color-film.

The most advantageous substance which I have found for producing this wettability is gum arabic. A solution of this is applied to the surface to be mirrored, whether that surface consists wholly of plain glass or a glass substitute, or wholly of a complete non-metal color-film over part or all of the glass surface, or partly of glass and partly of color-film resulting from the application of the color-film in some decorative pattern upon the surface to be mirrored, with such decorative pattern either on the plane surface of the glass or in suitable etching or grooves in such surface. The application of the gum arabic solution may be in any convenient way, as by "blocking" (mopping), brushing, flowing, or spraying, so long as care is taken that the entire surface to be mirrored is wetted by it. The bulk of the solution of gum arabic is drained off, and preferably washed off and rinsed. However, there has been a persisting change in the properties of the glass surface and color-film, which seems to indicate that some of the gum arabic has remained on such surface, probably by being adsorbed thereupon. As a result of this persisting change, the surface of the glass and of the color-film have become readily wettable both by water and by the water solutions used in depositing mirror-metals—such as mirroring solutions containing silver, gold, or copper, as well as preparatory solutions, such as stannous chloride.

After the treatment of the color-film and/or glass surface with the solution of gum arabic, such surface is treated with the water solution or solutions used for obtaining the deposit of the desired mirror-metal.

In the accompanying drawing I have illustrated my invention: Fig. 1 is a front view of a decorated mirror which has been produced by my invention; and Fig. 2 is a fragmentary perspective view showing the different steps of the process.

In the making of a decorated mirror, the decoration is usually applied in etchings, which have been produced in the rear surface of the mirror in the desired pattern. In the mirror shown, the rear surface of the glass 10 of the mirror has been provided with miter grooves 11 in a desired pattern. The non-metal color-film 12—which is desirably a lacquer of the nitro-cellulose type which has been suitably colored, as by aniline dyes—is applied to these miter grooves, in any suitable way, as by brushing, flowing, or spraying. However, the color-film 12 may be applied directly on the plane surface, in any suitable pattern or over the entire surface. Desirably the entire surface of the glass, after being polished as desired and having disfiguring scratches removed, is cleaned before the color-film is applied, in order to avoid any disfiguring of the completed mirror; but this cleaning is not so essential in order merely to obtain the adhesion of the mirror-metal, although it is desirable for the sake of the beauty of the mirror.

After this mirror-film has been applied where desired, the entire surface to be mirrored is treated with a water solution of gum arabic. This may be done by brushing; or by rubbing the surface with a fabric or fabric-covered block wet with such solution, which is called "blocking"; but it may also be done by other methods, such as spraying or pouring, though I think those methods of application are less desirable than brushing or blocking. The excess of gum arabic solution is washed off, desirably under flowing water, but there remains behind an effect, and almost certainly a trace of the gum arabic itself, probably by adsorption. I have indicated this in Fig. 2 of the drawing by light stippling 13. Fig. 2 shows this light stippling only over a portion of the glass; but this is merely to indicate in one view the different steps, and in actual practice the gum arabic solution is applied over the entire surface, as has already been stated.

The third step consists in applying the mirror-metal 14, which is also usually applied over the entire surface, whether that is of glass or of color-film or of both. The application of the mirror-metal may be in any suitable way, by any applicable process which does not destroy the color-film; and the mirror-metal may be any suitable metal, such as silver, gold, or copper, or any combination of such metals, deposited simultaneously or successively.

After the mirror-metal has been deposited, such metal is usually protected in any suitable way, as by successive coats of shellac and paint. As this protection is well known, and commonly practiced, I have not illustrated it.

By the use of my invention it is possible to get good plain mirrors more easily, by improving the adhesion of the mirror-metal to the glass or glass-substitute. It is also possible to get colored mirrors, of any desired color, by applying a thin color-film over the entire surface of the glass or glass-substitute, and applying the mirror-metal over such color-film in the manner above described. It is also possible to get any desired decoration of a mirror or of an unmirrored glass, by applying the color-film in any suitable pattern, whether in etched portions or on plane portions, and subsequently applying the mirror-metal to such color-film if the glass as a whole is to be unmirrored, or to both the color-film and directly to the remaining surface of the glass if a miror is desired.

I claim:

1. The process of mirror-making, which consists in applying a non-metal color-film to parts of the surface of the hyaline substance to be mirrored, treating such color-film and parts of the hyaline surface which are not covered by the color-film with a solution of a substance which renders such color-film and hyaline surface wettable by water and by water solutions used in depositing mirror-metals, and applying upon such treated color-film and hyaline surface the solution used in depositing the desired mirror-metal.

2. The process of mirror-making, which consists in applying a non-metal color-film to the surface of the hyaline substance to be mirrored, treating such color-film with a solution of a substance which renders such color-film wettable by water and by water solutions used in depositing mirror-metals, and applying upon such treated color-film the solution used in depositing the desired mirror-metal.

3. The process of mirror-making, which consists in treating the surface of a hyaline substance with a solution of a substance which renders such hyaline surface wettable by water and by water solutions used in depositing mirror-metals, and applying upon such treated hyaline surface the solution used in depositing the desired mirror-metal.

4. The process of decorating the surface of a hyaline substance, which consists in applying a non-metal color-film to parts of the surface of the hyaline substance to be decorated, treating such color-film with a solution of a substance which renders such color-film wettable by water and by water solutions used in depositing mirror-metals, and applying upon such treated color-film the solution used in depositing a desired mirror-metal.

5. The process of mirror-making, which consists in applying a non-metal color-film to parts of the surface of the glass to be mirrored, treating such color-film and parts of the glass surface which are not covered by the color-film with a solution of gum arabic, and applying upon such treated color-film and glass surface the solution used in depositing the desired mirror-metal.

6. The process of mirror-making, which consists in applying a non-metal color-film to the surface of the glass to be mirrored, treating such color-film with a solution of gum arabic, and applying upon such treated color-film the solution used in depositing the desired mirror-metal.

7. The process of mirror-making, which consists in treating the glass surface with a solution of gum arabic, and applying upon such treated glass surface the solution used in depositing the desired mirror-metal.

8. The process of glass decoration, which consists in applying a non-metal color-film to parts of the surface of the glass to be decorated, treating such color-film with a solution of gum arabic, and applying upon such treated color-film the solution used in depositing a desired mirror-metal.

9. A mirror, comprising a glass, a non-metal color-film on parts of the surface of such glass, and a layer of precipitated mirror-metal on and adhering to both such color-film and parts of the surface of the glass which are not covered by the color-film.

10. A mirror, comprising a glass, a non-metal color-film on the surface of such glass, and a layer of precipitated silver on and adhering to such color-film.

11. A decorated glass, comprising a glass, a non-metal color-film on parts of the surface of such glass, and a layer of precipitated mirror-metal on and adhering to such color-film.

12. A mirror, comprising a glass, a non-metal color-film on parts of the surface of such glass, and a layer of precipitated silver on and adhering to both such color-film and parts of the surface of the glass which are not covered by the color-film.

13. The process of decorating the surface of a hyaline substance, which consists in applying a non-metal color-film to parts of the surface of the hyaline substance to be decorated, treating such color-film with a solution of gum arabic, and applying upon such treated color-film the solution used in depositing a desired mirror-metal.

14. The process of glass decoration, which consists in applying a non-metal color-film to parts of the surface of the glass to be decorated, treating such color-film with a solution of a substance which renders such color-film wettable by water and by water solutions used in depositing mirror-metals, and applying upon such treated color-film the solution used in depositing a desired mirror-metal.

In witness whereof, I have hereunto set my hand at Indianapolis, Indiana, this 29th day of March, A. D. one thousand nine hundred and twenty-six.

ROBERT E. LYONS.